US008538669B2

(12) United States Patent
Agarwal et al.

(10) Patent No.: US 8,538,669 B2
(45) Date of Patent: Sep. 17, 2013

(54) GROUND BASED SYSTEM AND METHODS FOR IDENTIFYING INCURSIONS ALONG THE FLIGHT PATH OF AN IN-FLIGHT AIRCRAFT

(75) Inventors: Anand Agarwal, Karnataka (IN); David Brabham, Maple Valley, WA (US); Trip Redner, Kirkland, WA (US); SatyaBhaskar Payasam, Andhra Pradesh (IN)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/228,760

(22) Filed: Sep. 9, 2011

(65) Prior Publication Data

US 2013/0066543 A1 Mar. 14, 2013

(51) Int. Cl.
*G06F 19/00* (2011.01)

(52) U.S. Cl.
USPC ............ 701/120; 701/3; 701/4; 701/7; 701/9; 701/13; 701/14; 701/300; 701/301; 701/408; 340/945; 340/961; 340/963; 340/967; 340/968; 342/27; 342/28; 342/29; 342/30; 342/36; 342/46; 342/49; 342/52; 342/59; 342/175; 244/180; 244/181; 367/87; 367/93; 367/117

(58) Field of Classification Search
USPC ............. 701/3, 4, 7, 9, 13, 14, 120, 300, 301, 701/408; 340/945, 961, 963, 967, 968, 969, 340/970; 342/27, 28, 29, 30, 36, 46, 49, 342/52, 59, 175, 455, 456; 244/180, 181; 367/93, 87, 117; 356/4.01
See application file for complete search history.

(56) References Cited

U.S. PATENT DOCUMENTS

| | | | | |
|---|---|---|---|---|
| 6,606,563 | B2 * | 8/2003 | Corcoran, III | 701/301 |
| 7,081,834 | B2 * | 7/2006 | Ruokangas et al. | 340/945 |
| 7,212,917 | B2 * | 5/2007 | Wilson, Jr | 701/120 |
| 7,271,740 | B2 | 9/2007 | Fischer | |
| 7,619,555 | B2 * | 11/2009 | Rolfe | 342/29 |
| RE41,271 | E | 4/2010 | Vaida | |
| 7,957,853 | B2 * | 6/2011 | Stock et al. | 701/9 |
| 8,072,374 | B2 * | 12/2011 | Hovey | 342/357.31 |
| 2006/0293840 | A1 | 12/2006 | Klein | |

(Continued)

FOREIGN PATENT DOCUMENTS

EP 2341494 A1 7/2011

OTHER PUBLICATIONS

EP Search Report for Application No. EP 12 183 226.5 dated May 31, 2013.

(Continued)

*Primary Examiner* — McDieunel Marc
(74) *Attorney, Agent, or Firm* — Ingrassia Fisher & Lorenz, P.C.

(57) ABSTRACT

Methods and apparatus are provided for transmitting incursion alerts to a plurality of in-flight aircraft in accordance with preconfigured pilot preferences. The apparatus comprises a data store module containing data sets against which the pilot preferences are evaluated during flight, including weather, airspace and flight restrictions, ground delay programs, and air traffic information. The apparatus further includes a flight path module containing route and position information for each aircraft. An incursion alert processing module evaluates the flight path, data store, and pilot preferences and generates incursion alerts which are transmitted to each aircraft during flight, either directly or via ground based dispatchers or flight operations personnel.

18 Claims, 4 Drawing Sheets

(56) References Cited

U.S. PATENT DOCUMENTS

| | | | | |
|---|---|---|---|---|
| 2008/0183344 | A1 | 7/2008 | Doyen et al. | |
| 2008/0186222 | A1 * | 8/2008 | Rolfe | 342/36 |
| 2008/0195301 | A1 * | 8/2008 | Fabre et al. | 701/120 |
| 2009/0146875 | A1 * | 6/2009 | Hovey | 342/357.06 |
| 2009/0322567 | A1 * | 12/2009 | Stock et al. | 340/963 |
| 2011/0202206 | A1 * | 8/2011 | Karthikeyan et al. | 701/3 |
| 2012/0112950 | A1 * | 5/2012 | Hovey | 342/29 |

OTHER PUBLICATIONS

EP Office Action for Application No. EP 12 183 226.5 dated Jun. 24, 2013.

* cited by examiner

GROUND BASED SYSTEM AND METHODS FOR IDENTIFYING INCURSIONS ALONG THE FLIGHT PATH OF AN IN-FLIGHT AIRCRAFT

TECHNICAL FIELD

The present invention generally relates to ground based aircraft flight advisory systems, and more particularly relates to an automated module for determining incursions along a flight path and for uplinking alerts to in-flight aircraft based on preconfigured pilot preferences.

BACKGROUND

The three phases of commercial flight include pre-flight, in-flight, and post-flight. During the pre-flight phase, the pilot and/or dispatcher reviews the preparation checklist and identifies any issues that could impact the aircraft during takeoff, landing, or cause problems in flight. These activities are part of the pre-flight phase and are advisory in nature.

In the in-flight phase, pilots primarily rely upon on-board systems and ground-based support for updated information regarding airspace information. Pilot requests for information from ground based systems are event based and at the pilot's discretion. In addition, dispatchers monitoring flights for airlines and corporate aircraft fleets may also send updates based on their tracking of the in-flight aircraft.

Presently known systems are limited in several respects. On-board systems are costly and typically have a limited range. Uplinked messages are event based and must be initiated by the pilot. Moreover, they generally relate to current position and do not have the ability to predict upcoming issues along the flight path.

Presently known flight operation systems are further limited in that ground based flight operation specialists can only monitor a certain number of aircraft at a time, for example in the range of 8-20 aircraft. They are labor intensive and thus costly, and are not easily scalable.

Accordingly, it is desirable to provide flight operation systems which overcome the foregoing limitations. Furthermore, other desirable features and characteristics of the present invention will become apparent from the subsequent detailed description of the invention and the appended claims, taken in conjunction with the accompanying drawings and this background of the invention.

BRIEF SUMMARY

Systems and methods are provided for transmitting incursion alerts to a plurality of in-flight aircraft in accordance with preconfigured pilot preferences. The system includes a data store module containing data sets against which the pilot preferences are evaluated during flight, including weather, airspace and flight restrictions, ground delay programs, and air traffic information. The system further includes a flight path module containing route and position information for each aircraft, and an incursion alert processing module configured to evaluate the flight path information, data store, and pilot preferences and to generate incursion alerts and transmit them to the aircraft during flight.

A method is provided for transmitting incursion alerts to a plurality of aircraft during flight. The method involves configuring a set of pilot preferences for each aircraft during a pre-flight configuration phase, and applying the preconfigured sets to an incursion alert processing module. A data store of conditions impacting the aircraft during takeoff, landing, and in-flight is maintained, and the flight path for each aircraft is monitored. The flight path information and the data store are applied to the incursion alert processing module. The method further involves evaluating the sets of pilot preferences against the data store for each aircraft and its associated flight path, generating an incursion alert for each aircraft based on the evaluation, and transmitting incursion alerts to the various aircraft during flight.

BRIEF DESCRIPTION OF THE DRAWINGS

The present invention will hereinafter be described in conjunction with the following drawing figures, wherein like numerals denote like elements.

DETAILED DESCRIPTION

Figure 1:
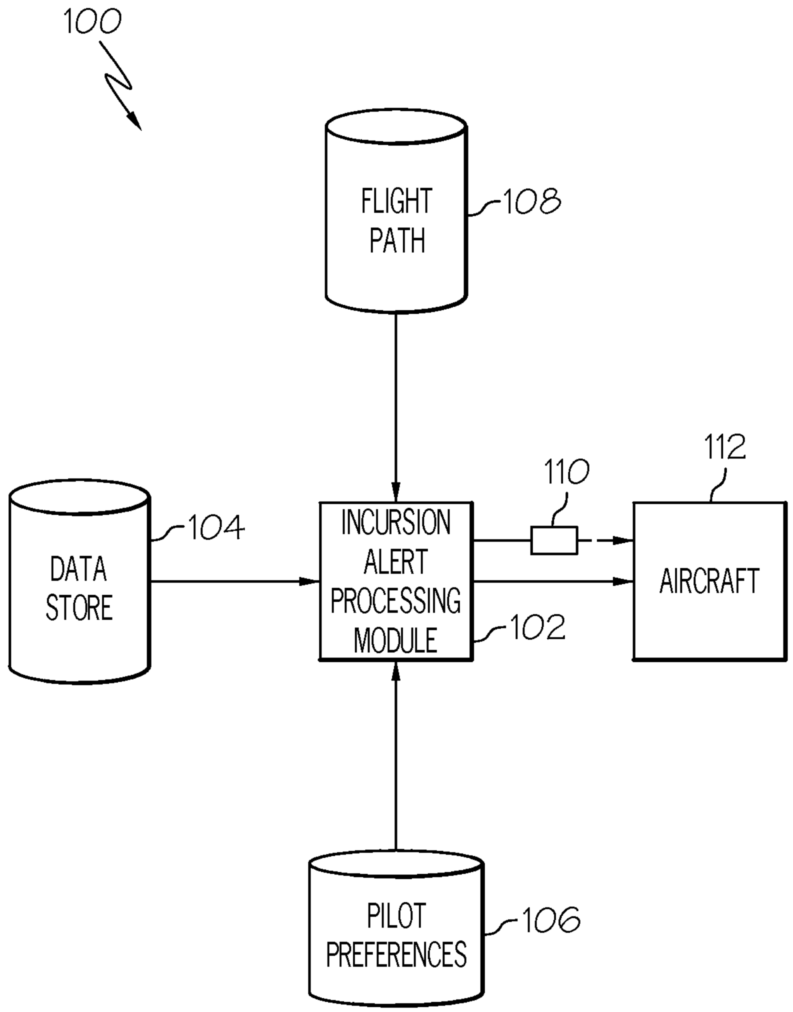
FIG. 1 is a block diagram of an exemplary incursion alert system in accordance with the subject matter described herein.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Those of skill in the art will appreciate that the various illustrative logical blocks, modules, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

In one implementation of this embodiment, the monitored system is an aircraft. In another implementation of this embodiment, the monitored system is a land vehicle or water-based vehicle.

Referring now to FIG. 1, an incursion alert system 100 includes a data store 104, an incursion alert processing module (IAPM) 102, a flight path data module 108, and a pilot preferences module 106. Data store 104, flight path data module 108, and pilot preferences module 106 feed information to incursion alert processing module 102 which, in turn, generates an incursion alert 110 and transmits it to an aircraft 112. The incursion alert reports the existence of an event that might impact the aircraft, for example issues relating to safety, scheduling, delays, convenience, and the like. The alert may include text, graphics, or both.

Figure 2:
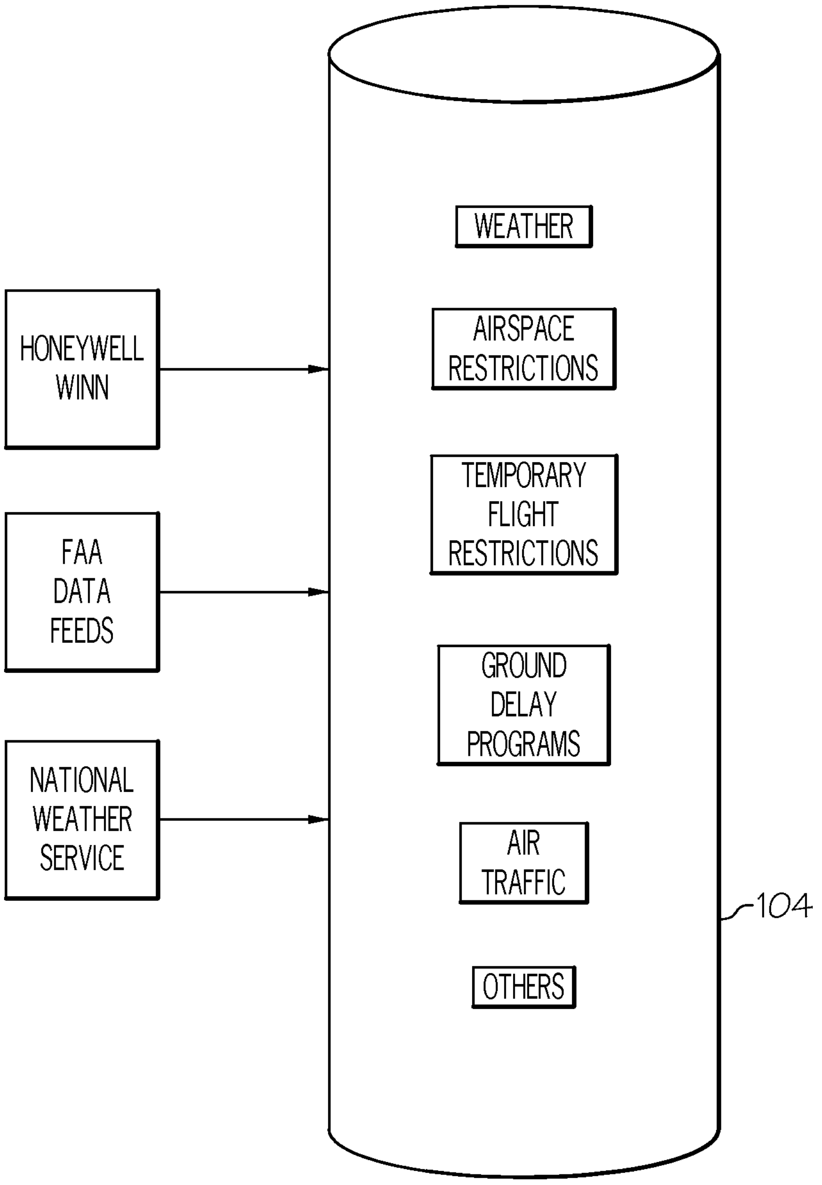
FIG. 2 is a block diagram of an exemplary data store module for use in connection with the incursion alert system of FIG. 1.

Data store 104 maintains data regarding various conditions that could affect the aircraft during take off, landing, and in flight. Referring now to FIG. 2, these data include, but are not limited to, information pertaining to weather, airspace restrictions, temporary flight restrictions, ground delay programs, air traffic, and other data. Data store 104 may be fed with data and information from various sources, including Federal Aviation Administration (FAA) Data Feeds, Honeywell's WINN product, the National Weather Service, and the like.

Figure 3:
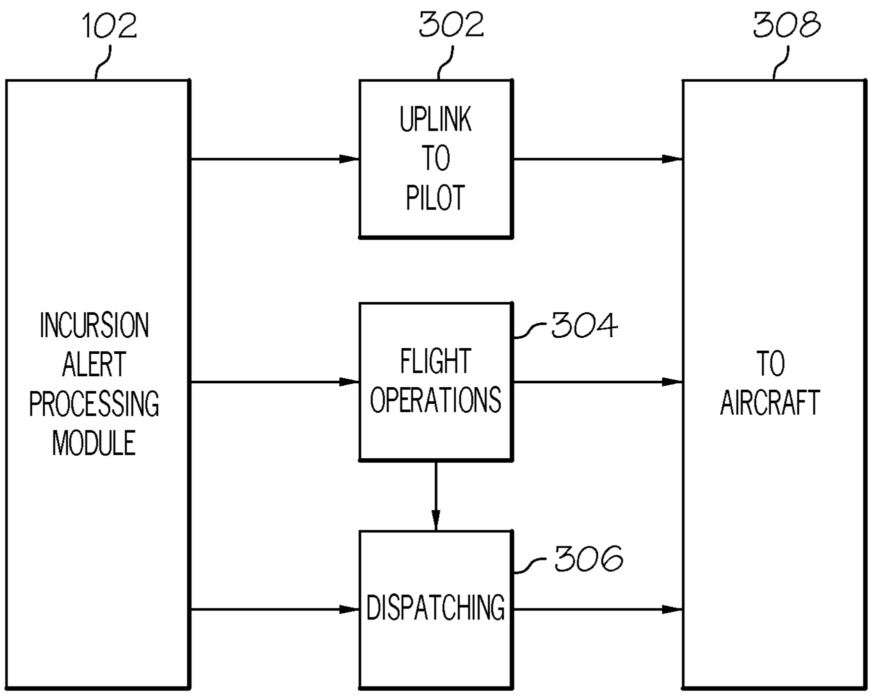
FIG. 3 is a block diagram illustrating various modes for transmitting incursion alerts to in-flight aircraft.

Referring now to FIG. 3, incursion alert processing module 102 generates incursion alerts and provides them to one or more aircraft 308. More particularly, the incursion alert may be provided as an uplink 302 to the pilot through a known datalink application. Alternatively, the incursion alert may be provided to ground-based flight operations personnel 304, who verify the assessment and/or other information contained in the incursion alert and forward the alert to the pilot. As a further alternative, the incursion alert may be provided to corporate or airline dispatchers 306 by the incursion alert processing module 102 or to operational personnel 304, who then forward the alert to the aircraft.

Figure 4:
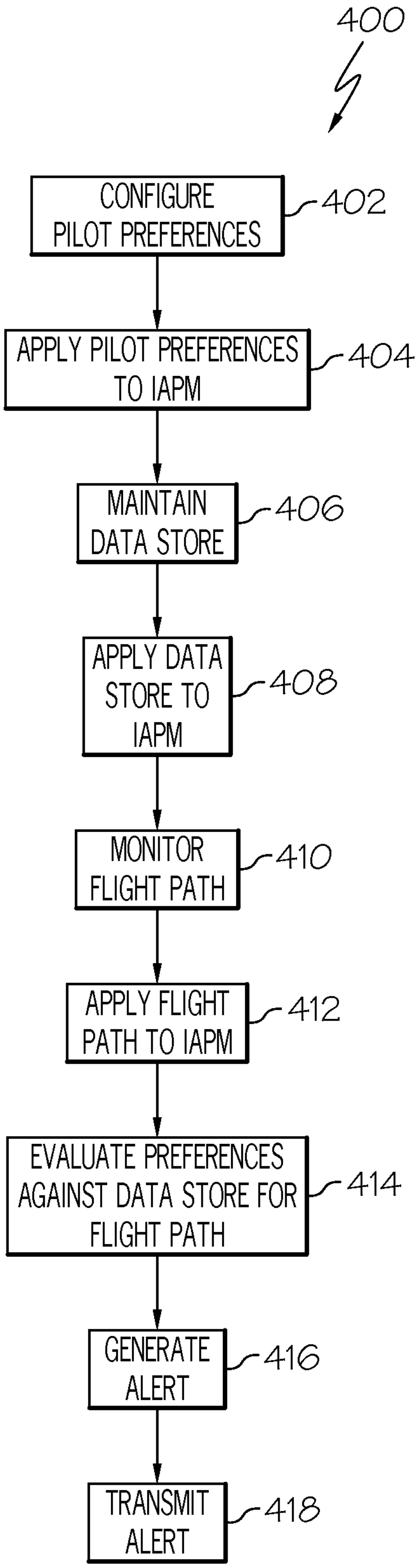
FIG. 4 is a flow chart diagram illustrating a method for generating incursion alerts and transmitting them to in-flight aircraft in accordance with a preferred embodiment.

FIG. 4 is a flowchart setting forth an exemplary method 400 for generating incursion alerts and transmitting them to aircraft in accordance with a preferred embodiment. In this regard, in view of the automated nature (e.g. computer implemented) of incursion alert processing module 102, system operators may safely monitor a greater number of aircraft, for example in the range of 200-500 or more.

Method 400 includes configuring a set of pilot preferences (task 402) for each aircraft. Pilot preferences relate to conditions and circumstances about which a pilot desires to receive an alert during flight, and may establish tolerance levels above which an alert is to be sent. Pilot preferences are configured during the pre-flight phase. In a preferred embodiment, pilot preferences are configured on line using a web-based interface.

The pre-configured pilot preferences are applied to incursion alert processing module 102 (task 404). This may be done iteratively or in a batch process. A data store is maintained (task 406) including information relating to conditions affecting or impacting the aircraft during takeoff, landing, and in flight. The data store is also fed to incursion alert processing module 102 (task 408), preferably providing real time updates.

With continued reference to FIG. 4, the system monitors the flight path, including route and position data, for each aircraft (task 410). The flight path data is also applied to incursion alert processing module 102 (task 412).

The system evaluates the set of pilot preferences against the data store for the aircraft and its associated flight path (task 414), and generates an incursion alert (as necessary) based on the ongoing evaluation (task 416). The incursion alert is then transmitted to the aircraft (task 418), as discussed above in connection with FIG. 3.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for providing incursion alerts to a plurality of aircraft during flight, comprising:

configuring, using a processor, a set of pilot preferences for each one of said aircraft during a pre-flight configuration phase;

applying said set of pilot preferences to an incursion alert processing module for each one of said aircraft;

maintaining a data store of conditions impacting said plurality of aircraft during takeoff, landing, and in flight, said data store of conditions including conditions relating to weather, airspace restrictions, temporary flight restrictions, ground delay programs, and air traffic;

applying said data store to said incursion alert processing module;

monitoring a respective flight path for each of said plurality of aircraft during flight;

applying route and position data for each of said plurality of aircraft to said incursion alert processing module;

evaluating by a processor, for each one of said aircraft, a corresponding one of said set of pilot preferences and an associated flight path against said data store;

generating an incursion alert for each of said aircraft based on said evaluation; and transmitting one of said incursion alerts to each one of said aircraft during flight.

2. The method of claim 1, wherein configuring comprises selecting pilot tolerances for a plurality of said conditions.

3. The method of claim 1, wherein applying pilot preferences comprises applying a static set of pilot preferences to said incursion alert processing module prior to take off.

4. The method of claim 3, wherein configuring comprises accessing a web site and interactively configuring said pilot preferences.

5. The method of claim 1, wherein monitoring comprises dynamically monitoring the route and position of each of said plurality of said aircraft during flight.

6. The method of claim 1, wherein generating comprises generating a textual and graphical incursion alert.

7. The method of claim 1, wherein transmitting comprises uplinking said incursion alert to said pilot during flight.

8. The method of claim 1, wherein transmitting comprises:

sending said incursion alert to ground based flight operations personnel;

reviewing and validating said incursion alert by said ground based flight operations personnel; and forwarding said incursion alert to said aircraft by said ground based flight operations personnel during flight.

9. The method of claim 1, wherein transmitting comprises providing said incursion alert to an airline dispatcher.

10. The method of claim 1, wherein said monitoring comprises monitoring in the range of 200-500 aircraft.

11. A method for providing incursion alerts to an in-flight aircraft, comprising:

monitoring a flight path for said aircraft during flight;

dynamically maintaining a data store of takeoff, landing, and in-flight conditions for said aircraft, said data store including data pertaining to weather, airspace restrictions, temporary flight restrictions, ground delay programs, and air traffic;

configuring, using a processor, prior to takeoff, a set of pilot preferences pertaining to said data store;

evaluating, by a processor, said pilot preferences against said data store for said flight path during flight;

generating an incursion alert based on said evaluation; and transmitting said incursion alert to said aircraft.

12. The method of claim 11, wherein monitoring comprises dynamically monitoring route and position information for said aircraft.

13. The method of claim 11, wherein configuring comprises accessing a web-based computer implemented application and interactively selecting tolerance levels associated with said pilot preferences.

14. The method of claim 13, wherein configuring is performed prior to take off.

15. The method of claim 11, wherein transmitting comprises uplinking said incursion alert to said aircraft during flight using a computer implemented application.

16. The method of claim 11, wherein transmitting comprises notifying ground based flight operations personnel of said incursion alert, analyzing said incursion alert by said personnel, and forwarding said incursion alert to said aircraft.

17. The method of claim 11, wherein transmitting comprises sending said incursion alert to an airline dispatcher.

18. An apparatus for transmitting incursion alerts to a plurality of in-flight aircraft in accordance with preconfigured pilot preferences, comprising:

a data store module containing data sets against which said pilot preferences are evaluated during flight, including weather, airspace and flight restrictions, ground delay programs, and air traffic information;

a flight path module containing route and position information for each aircraft;

an incursion alert processing module configured to evaluate said flight path, said data store, and said pilot preferences and to generate incursion alerts and to transmit said incursion alerts to each of said aircraft during flight.

* * * * *